US012617434B2

(12) United States Patent

Liu et al.

(10) Patent No.: US 12,617,434 B2

(45) Date of Patent: May 5, 2026

(54) UNINTENTIONAL CONTROL RE-ENGAGEMENT PREVENTION

(71) Applicant: Toyota Jidosha Kabushiki Kaisha, Toyota (JP)

(72) Inventors: Yiting Liu, Dublin, CA (US); Hirofumi Yamamoto, Cupertino, CA (US); Chen Bao, Newark, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 105 days.

(21) Appl. No.: 18/236,976

(22) Filed: Aug. 23, 2023

(65) Prior Publication Data

US 2025/0065918 A1 Feb. 27, 2025

(51) Int. Cl.

*B60W 50/00* (2006.01)
*B60W 50/04* (2006.01)
*B60W 50/08* (2020.01)
*B60W 60/00* (2020.01)

(52) U.S. Cl.

CPC .... *B60W 60/00186* (2020.02); *B60W 50/045* (2013.01); *B60W 50/08* (2013.01)

(58) Field of Classification Search

CPC ......... B60W 60/00186; B60W 50/045; B60W 50/08; B60W 2050/0042

See application file for complete search history.

(56) References Cited

U.S. PATENT DOCUMENTS

| | | | | |
|---|---|---|---|---|
| 5,774,069 | A | 6/1998 | Tanaka et al. | |
| 9,342,074 | B2 | 5/2016 | Dolgov et al. | |
| 10,466,698 | B1 | 11/2019 | Valasek et al. | |
| 2010/0179715 | A1 | 7/2010 | Puddy | |
| 2015/0016886 | A1* | 1/2015 | Frelich | E01C 19/002 123/339.16 |
| 2019/0291745 | A1* | 9/2019 | Sikorski | B60W 50/14 |
| 2020/0369238 | A1* | 11/2020 | Toyooka | G05D 1/223 |
| 2022/0048507 | A1* | 2/2022 | Grewal | B60W 30/17 |
| 2022/0063678 | A1* | 3/2022 | McPeek-Bechtold | B60W 50/082 |
| 2022/0185332 | A1* | 6/2022 | Bartels | B60W 50/16 |

* cited by examiner

*Primary Examiner* — Abby J Flynn

(74) *Attorney, Agent, or Firm* — Christopher G. Darrow; Darrow Mustafa PC

(57) ABSTRACT

Systems, methods, and other embodiments described herein relate to preventing accidentally or unintentionally re-engaging a vehicle control system after recently dis-engaging the vehicle control system. In one embodiment, a method includes, in response to a vehicle control system being disengaged, activating a lockout period, and preventing the vehicle control system from re-engaging during the lockout period.

18 Claims, 3 Drawing Sheets

UNINTENTIONAL CONTROL RE-ENGAGEMENT PREVENTION

TECHNICAL FIELD

The subject matter described herein relates, in general, to systems and methods for preventing a vehicle control system being unintentionally re-engaged after recently being disengaged.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles are equipped with one or more vehicle control systems such as a lane keeping assist system and an adaptive cruise control system. These vehicle control systems can be unintentionally or accidentally re-engaged after being recently disengaged, which may lead to a miscommunication between a vehicle operator and the vehicle.

SUMMARY

This section generally summarizes the disclosure and is not a comprehensive explanation of its full scope or all its features.

In one embodiment, a method for preventing unintentionally re-engaging a vehicle control system after recently dis-engaging the vehicle control system is disclosed. The method includes, in response to a vehicle control system being disengaged, activating a lockout period, and preventing the vehicle control system from re-engaging during the lockout period.

In another embodiment, a system for preventing unintentionally re-engaging a vehicle control system after recently dis-engaging the vehicle control system is disclosed. The system includes a processor and a memory in communication with the processor. The memory stores machine-readable instructions that, when executed by the processor, cause the processor to, in response to a vehicle control system being disengaged, activate a lockout period and prevent the vehicle control system from re-engaging during the lockout period.

In another embodiment, a non-transitory computer-readable medium for preventing unintentionally re-engaging a vehicle control system after recently dis-engaging the vehicle control system and including instructions that, when executed by a processor, cause the processor to perform one or more functions, is disclosed. The instructions include instructions to, in response to a vehicle control system being disengaged, activate a lockout period and prevent the vehicle control system from re-engaging during the lockout period.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
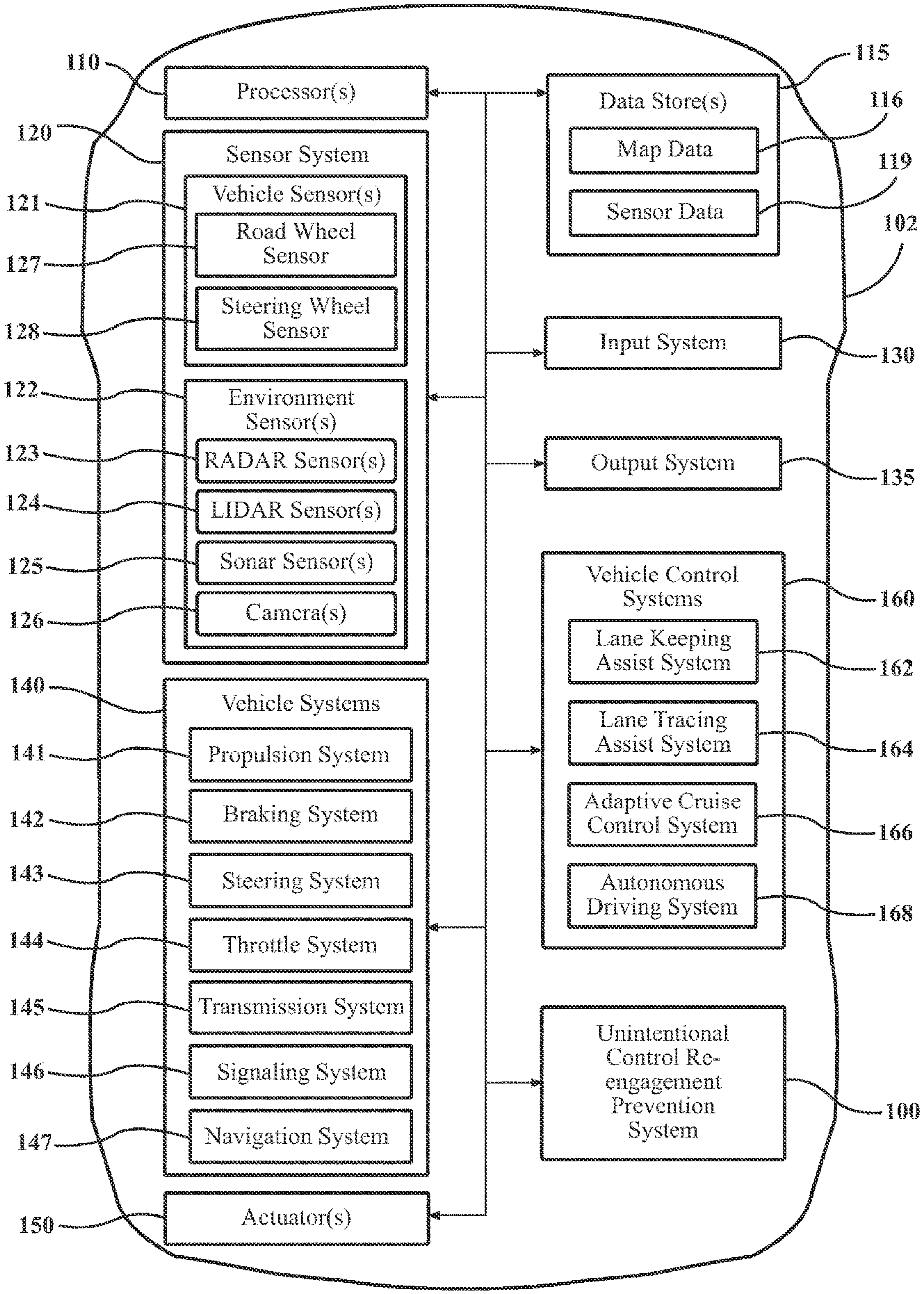
FIG. 1 illustrates a block diagram of a vehicle incorporating an unintentional control re-engagement prevention system.

Systems, methods, and other embodiments associated with preventing a vehicle control system being unintentionally re-engaged after recently being disengaged, are disclosed. A vehicle can be controlled using various vehicle control systems such as a lane keeping assist system, a lane tracing assist system, an autonomous vehicle control system, an autopilot system, and/or an adaptive cruise control system. A vehicle control system that is engaged or activated is actively controlling a portion of a vehicle, while a vehicle control system that is disengaged or deactivated does not control any portion of the vehicle.

Vehicle control systems can be activated or deactivated in multiple ways. As an example, a vehicle operator may activate and/or deactivate the vehicle control system(s) using vehicle systems such as a braking system, a throttle system, or a steering system. As another example, a vehicle operator may activate and/or deactivate the vehicle control system(s) using a toggle switch, a touch screen, a depressible button, a slide switch or any other suitable input mechanism.

Vehicle control systems that can be re-engaged or disengaged using one button may be inadvertently re-engaged after being disengaged if, as an example, the vehicle operator depresses the button multiple times in quick succession. As another example, in a case with the activation button and the deactivation button are close to each other, the vehicle operator may inadvertently re-engage the vehicle control system after disengaging the vehicle control system. Further and as an example, a faulty input mechanism with a mechanical issue such as a button that sticks may cause the vehicle control system to re-engage after being disengaged.

An unplanned re-engagement of a vehicle control system may result in the control of the vehicle being handed back to the vehicle control system at a time when the vehicle operator may have determined that it would be safer for the vehicle to be manually operated and not controlled using the vehicle control system. The vehicle operator may have determined that a recent event may be beyond the capability of the vehicle control system. As such, in such an event, the vehicle control system may be incapable of adequately and safely controlling the vehicle, which can be dangerous.

Current methods are unable to prevent the unintentional re-engagement of a vehicle control system. In place of preventing the unintentional re-engagement of the vehicle control system, current methods may issue an alarm such as an audio alarm or visual alarm indicating that the vehicle control system has been re-engaged.

Accordingly, in one embodiment, the disclosed approach is a system that, in response to a vehicle control system being disengaged, activates a lockout period, and prevents the vehicle control system from re-engaging during the lockout period.

The system may determine that the vehicle control system has been disengaged using sensors or by requesting and receiving a status of the vehicle control system from an electronic control unit (ECU). The system may then determine a length of the lockout period. The system may determine the length of the lockout period based on one or more of a characteristic of the vehicle control system, a risk level, a user preference, an input mechanism, and/or an environmental condition of the vehicle that includes the vehicle control system.

In one embodiment, the lockout period may include multiple phases. The phases may be associated with different functions of the vehicle control system(s), different functional levels of the vehicle control system(s), and/or different time periods.

The system may prevent the vehicle control system from re-engaging during the lockout period by breaking the communication between the input mechanism and the vehicle control system(s) during the lockout period. As an example, for an input mechanism and a vehicle control system that communicate by wire, the wire may include an on-off switch that the system may turn off to prevent the input mechanism from communicating with the vehicle control system. The system may turn on the switch to enable the input mechanism to communicate with the vehicle control system after the lockout period has expired.

The embodiments disclosed herein present various advantages over the current methods. First, the embodiments reduce unexpected re-engagement of a vehicle control system. Second, the embodiments utilize sensors and software resources, and do not require extensive hardware resources.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, a block diagram of a vehicle 102 incorporating an unintentional control re-engagement prevention system 100 is illustrated. The vehicle 102 includes various elements. It will be understood that in various embodiments, it may not be necessary for the vehicle 102 to have all of the elements shown in FIG. 1. The vehicle 102 can have any combination of the various elements shown in FIG. 1. Further, the vehicle 102 can have additional elements to those shown in FIG. 1. In some arrangements, the vehicle 102 may be implemented without one or more of the elements shown in FIG. 1. While the various elements are shown as being located within the vehicle 102 in FIG. 1, it will be understood that one or more of these elements can be located external to the vehicle 102. Further, the elements shown may be physically separated by large distances. For example, as discussed, one or more components of the disclosed system can be implemented within a vehicle while further components of the system can be implemented within a cloud-computing environment.

Some of the possible elements of the vehicle 102 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 102 includes an unintentional control re-engagement prevention system 100 that is implemented to perform methods and other functions as disclosed herein relating to preventing re-engaging a vehicle control system after recently dis-engaging the vehicle control system. As an example, the unintentional control re-engagement prevention system 100, in various embodiments, may be implemented partially within the vehicle 102 and may further exchange communications with additional aspects of the unintentional control re-engagement prevention system 100 that are remote from the vehicle 102 in support of the disclosed functions. Thus, while FIG. 2 generally illustrates the unintentional control re-engagement prevention system 100 as being self-contained, in various embodiments, the unintentional control re-engagement prevention system 100 may be implemented within multiple separate devices some of which may be remote from the vehicle 102.

The vehicle 102 can include one or more vehicle control systems 160. The vehicle control system 160 can include one or more devices, applications, and/or combinations thereof, now known or later developed, configured to control the movement, speed, maneuvering, heading, direction, etc. of the vehicle 102. The vehicle control systems 160 can include one or more driver assistance systems such as a lane keeping assist system 162, a lane tracing assist system 164, an adaptive cruise control system 166, an autonomous driving system 168, a lane centering system, a collision avoidance system, and/or a driver monitoring system.

As an example, a vehicle control system 160 may be capable of being manually or automatically engaged. Further, the vehicle control system may be capable of being manually or automatically disengaged. As such and as example, a user may manually engage and/or disengage a vehicle control system by operating a control device such as a knob, a button, or a touch screen. In such an example, the user may turn the knob, depress the button, or touch the touch screen. As another example, the user may control the engagement and/or disengagement of the vehicle control system using a steering wheel and/or the control pedals such as the acceleration pedal or the brake pedal. In general, the user may enter an input into a user interface located in a control panel of the vehicle.

As another example, a vehicle and/or a vehicle system operating in an autonomous mode may automatically engage and/or disengage the vehicle control system using any suitable method. As an example, the vehicle and/or vehicle system may transmit an electronic signal to an ECU to engage and/or disengage the vehicle control system. As another example, the vehicle control system may automatically disengage after an event such as after a time period has expired.

The vehicle 102 can include a sensor system 120. The sensor system 120 can include one or more vehicle sensors 121. The vehicle sensor(s) 121 can detect, determine, and/or sense information about the vehicle 102 itself. In one or more arrangements, the vehicle sensor(s) 121 can be configured to detect, and/or sense position and orientation changes of the vehicle 102, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), and/or other suitable sensors. The vehicle sensor(s) 121 can be configured to detect, and/or sense one or more characteristics of the vehicle 102.

Figure 2:
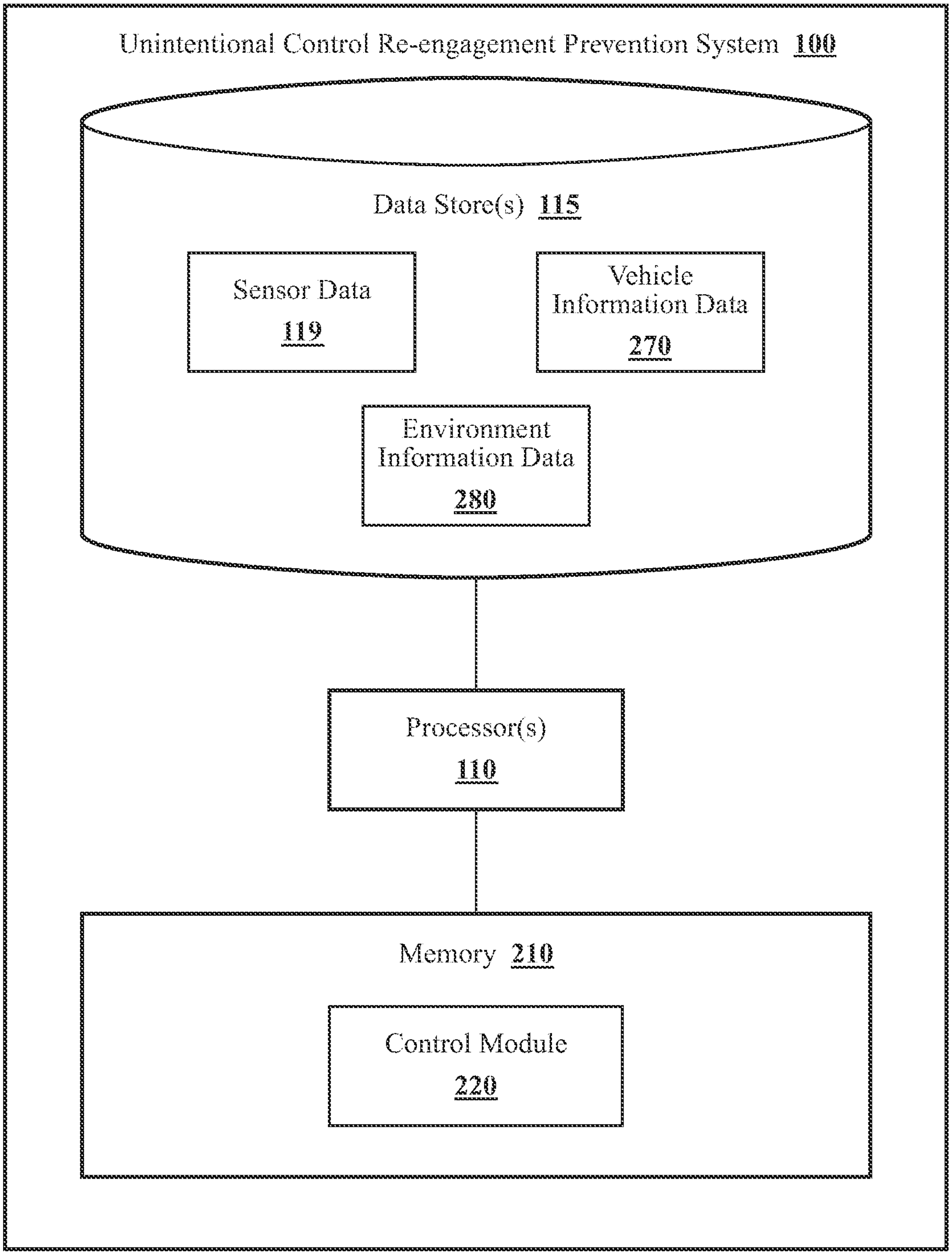
FIG. 2 is a more detailed block diagram of the unintentional control re-engagement prevention system of FIG. 1.

With reference to FIG. 2, a more detailed block diagram of the unintentional control re-engagement prevention system 100 is shown. The unintentional control re-engagement prevention system 100 may include a processor(s) 110. Accordingly, the processor(s) 110 may be a part of the unintentional control re-engagement prevention system 100, or the unintentional control re-engagement prevention system 100 may access the processor(s) 110 through a data bus or another communication pathway. In one or more embodiments, the processor(s) 110 is an application-specific integrated circuit that may be configured to implement functions associated with a control module 220. More generally, in one or more aspects, the processor(s) 110 is an electronic processor, such as a microprocessor that can perform various functions as described herein when loading the control module and executing encoded functions associated therewith.

The unintentional control re-engagement prevention system 100 may include a memory 210 that stores the control module 220. The memory 210 may be a random-access memory (RAM), read-only memory (ROM), a hard disk drive, a flash memory, or other suitable memory for storing the control module 220. The control module 220 includes, for example, computer-readable instructions that, when executed by the processor(s) 110, cause the processor(s) 110 to perform the various functions disclosed herein. While, in one or more embodiments, the control module 220 is a set of instructions embodied in the memory 210, in further aspects, the control module 220 includes hardware, such as processing components (e.g., controllers), circuits, etc. for independently performing one or more of the noted functions.

The unintentional control re-engagement prevention system 100 may include a data store(s) 115 for storing one or more types of data. Accordingly, the data store(s) 115 may be a part of the unintentional control re-engagement prevention system 100, or the unintentional control re-engagement prevention system 100 may access the data store(s) 115 through a data bus or another communication pathway. The data store(s) 115 is, in one embodiment, an electronically based data structure for storing information. In at least one approach, the data store 115 is a database that is stored in the memory 210 or another suitable medium, and that is configured with routines that can be executed by the processor(s) 110 for analyzing stored data, providing stored data, organizing stored data, and so on. In either case, in one embodiment, the data store 115 stores data used by the control module 220 in executing various functions. In one embodiment, the data store 115 may be able to store sensor data 119 and/or other information that is used by the control module 220.

The data store(s) 115 may include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 may be a component of the processor(s) 110, or the data store(s) 115 may be operatively connected to the processor(s) 110 for use thereby. The term "operatively connected" or "in communication with" as used throughout this description, can include direct or indirect connections, including connections without direct physical contact.

In one or more arrangements, the data store(s) 115 can include sensor data 119. The sensor data 119 can originate from the sensor system 120 of the vehicle 102. The sensor data 119 can include data from visual sensors, audio sensors, and/or any other suitable sensors in the vehicle 102.

In one or more arrangements, the data store(s) 115 can include vehicle information data 270. The vehicle information data 270 may include information about the vehicle 102 such as speed of travel, which vehicle control systems are currently engaged, autonomous level currently being utilized, and/or energy levels (e.g., fuel levels or electric charge). The vehicle information data 270 may be from the vehicle control system(s) 160, the ECU, or any suitable control or monitoring system.

In one or more arrangements, the data store(s) 115 can include environment information data 280. The environment information data 280 may include information about the environment surrounding the vehicle 102 such as traffic levels, weather conditions, location and condition of the path that the vehicle 102 is travelling on. The weather conditions may include rain levels, snow levels, visibility conditions such as fog. The location of the path(s) may include geographic coordinates of the path. The condition of the path may include information about the physical condition of the path such as surface friction, the presence of potholes, road debris, and vegetation.

The sensor data 119, the vehicle information data 270, and the environment information data 280 may be digital data that describe information used by the unintentional control re-engagement prevention system 100.

In one embodiment, the control module 220 may include instructions that, when executed by the processor(s) 110, cause the processor(s) 110 to, in response to a vehicle control system 160 being disengaged, activate a lockout period, and prevent the vehicle control system 160 from re-engaging during the lockout period.

In one embodiment, the control module 220 may determine that the vehicle control system 160 is being disengaged in any suitable method. As an example, the control module 220 may communicate with an ECU associated with the vehicle control system 160. In such an example, the control module 220 may request and receive a status of the vehicle control system 160 from the associated ECU. The status of the vehicle control system 160 may be engaged or disengaged, on or off, or any suitable manner for indicating whether the vehicle control system 160 is presently active or inactive. As another example, the control module 220 may communicate with the vehicle control system 160, requesting and receiving the status of the vehicle control system 160. In such an example, the control module 220 may transmit the request and receive the status using the CAN bus.

The control module 220 may poll a single vehicle control system 160 or multiple vehicle control systems 160, requesting and receiving the status of the vehicle control system(s) 160. As another example, the control module 220 may detect that the vehicle control system 160 is being disengaged using a sensor. In such an example, the control module 220 may receive sensor data 119 indicating that the effect of the vehicle control system 160 is no longer apparent. The control module 220 may determine that the vehicle control system 160 has disengaged based on the sensor data 119 and by utilizing any suitable machine learning techniques. As an example, the control module 220 may determine that the lane keeping assist system 162 has disengaged when the sensor data 119 indicates that the vehicle 102 is veering towards a curb.

In response to determining that the vehicle control system 160 is being disengaged or has disengaged, the control module 220 may activate a lockout period. The lockout period is a length of time in which the vehicle control system 160 is unable to be re-engaged. The length of the lockout period may be based on one or more conditions. In one example, the length of the lockout period may be an arbitrary or fixed value. In such an example, the length of the lockout period may be based on a factory setting such as five (5) seconds. In another example, the length of the lockout period may be the same for all vehicle control systems. In another example, the length of the lockout period may be based on a characteristic of the vehicle control system 160. The length of the lockout period may be based on the type of vehicle control system 160 such that the length of the lockout period for the lane keeping assist system 162 may differ from the length of the lockout period of the adaptive cruise control system 166.

The length of the lockout period could be based on the input mechanism. The input mechanism refers to the physical type of input the user may utilize to engage or disengage a vehicle control system 160. As an example, the length of the lockout period may be based on the input mechanism being a toggle switch, a button, a knob, or a touchscreen. As an example, in a case where the input mechanism is a button can be used to toggle between disengaging and engaging a vehicle control system 160, the control module 220 may set the length of the lockout period to five seconds such that when a user depresses the button twice in less than five seconds, the related vehicle control system 160 remains locked out until the lockout period of five seconds expires.

The length of the lockout period could be based on an environmental condition of the vehicle 102 that includes the vehicle control system 160. As an example, the environmental condition may be traffic levels surrounding the vehicle 102 or the weather conditions. The control module 220 may utilize sensor data 119 as well as any suitable machine learning techniques and/or any suitable artificial intelligence to determine the environmental condition. The control module 220 may determine a suitable length of time for the lockout period based on the environmental conditions. As an example, the control module 220 may determine the length of the lockout period to be shorter in heavy traffic such that the vehicle control system 160 can be re-engaged sooner, and the vehicle 102 and the vehicle control system(s) 160 can be more responsive.

The length of the lockout period could be based on a risk level, which may include a risk and/or a level of the risk. As an example, the risk level may be related to vehicle type, condition of the vehicle 102, e.g., if the vehicle 102 is experiencing an emergency such as a system failure, or if the vehicle 102 is operating in manual vehicle control, and/or varying levels of autonomous vehicle control. The risk level may be related to road conditions, visibility issues, and/or traffic levels. The control module 220 may utilize sensor data 119, vehicle information data 270, as well as any suitable machine learning techniques and/or any suitable artificial intelligence to determine the risk level. The control module 220 may then determine a suitable length of time for the lockout period based on the risk level. As such, the control module 220 may enable re-engaging the vehicle control system 160 earlier or later depending on the risk and/or the level of the risk. As an example, the control module 220 may enable re-engaging the vehicle control system 160 earlier in a case where the risk level is high and re-engaging the vehicle control system 160 may reduce the risk level. Further, the control module 220 may delay re-engaging the vehicle control system 160 in a case where the risk level is medium and re-engaging the vehicle control system 160 too early may increase the risk level.

The length of the lockout period could be based on a user preference. The user may enter their preferences using, as an example, a touch screen. The user preferences may be stored within the vehicle information data 270. The control module 220 may utilize the user preferences stored in the vehicle information data 270 and may set the lockout periods for the various vehicle control systems 160 based on the user preferences.

In one embodiment, the control module 220 may include instructions that, when executed by the processor(s) 110, cause the processor(s) 110 to, prevent a portion of the vehicle control system 160 from re-engaging based on a phase of the lockout period. The lockout period includes a plurality of phases, and the plurality of phases includes the phase.

The lockout period may include multiple phases and each of the multiple phases may be associated with a different function. As an example, the lockout period for a vehicle control system 160 may include multiple phases associated with various functions of the vehicle control system 160. In such an example, when the lockout period is in a first phase, the control module 220 may prevent the vehicle control system 160 from re-engaging. When the lockout period is in a second phase, the control module 220 may prevent a portion of the vehicle control system 160 from re-engaging.

The portion of the vehicle control system 160 may refer to functions of the vehicle control system 160. As an example, the vehicle control system 160 that is being disengaged is an autonomous driving system 168 and the autonomous driving system 168 includes multiple functions. The portion of the vehicle control system 160 may refer to one or more of the multiple functions. In such an example, the lockout period may have three phases-a first phase, a second phase, and a third phase. The time periods for the first phase, second phase, and third phase may be 2 seconds, 4 seconds, and 7 seconds respectively. After the autonomous driving system 168 has been disengaged, the control module 220 may prevent the autonomous driving system 168 from re-engaging during the first phase. After the time period associated with the first phase expires, the control module 220 may permit one function of the autonomous driving system 168 such as steering system 143 to be re-engaged while preventing other functions of the autonomous driving system 168 from re-engaging. After the time period associated with the second phase expires, the control module 220 may permit acceleration control to be re-engaged while still preventing other functions of the autonomous driving system 168 from re-engaging. After the time period associated with the third phase expires, the control module 220 may permit all the functions of the autonomous driving system 168. The control module 220 may prevent and/or permit the functions of the vehicle control system 160 using any suitable methods.

As another example, the vehicle control system 160 that is being disengaged is an adaptive cruise control system 166 and the adaptive cruise control system 166 includes multiple functional levels. The portion of the vehicle control system 160 may refer to one or more functional levels. A functional level may refer a degree to which the vehicle control system 160 may perform the function. As an example, the lockout period may have two phases-a first phase and a second phase. The time periods for the first phase and the second phase may be 5 seconds and 10 seconds respectively. After the adaptive cruise control system 166 has been disengaged, the control module 220 may prevent the adaptive cruise control system 166 from re-engaging during the first phase. After the time period associated with the first phase expires, the control module 220 may permit the adaptive cruise control system 166 to function up to a certain speed, e.g. 40 mph and may prevent the adaptive cruise control system 166 from functioning over the certain speed. After the time period associated with the second phase expires, the control module 220 may permit all the functions of the adaptive cruise control system 166 with no limitation on speed. The control module 220 may prevent and/or permit the functional levels of the vehicle control system 160 using any suitable methods. As an example, the vehicle control system 160 and the input mechanism may be connected by an electric circuit with a switch that may be controlled by the control module 220. In such an example, the control module 220 may prevent the vehicle control system 160 from being responsive to the input mechanism by deactivating the switch. In general, the control module 220 may cut the communication between the vehicle control system 160 and the input mechanism in any suitable manner.

Figure 3:
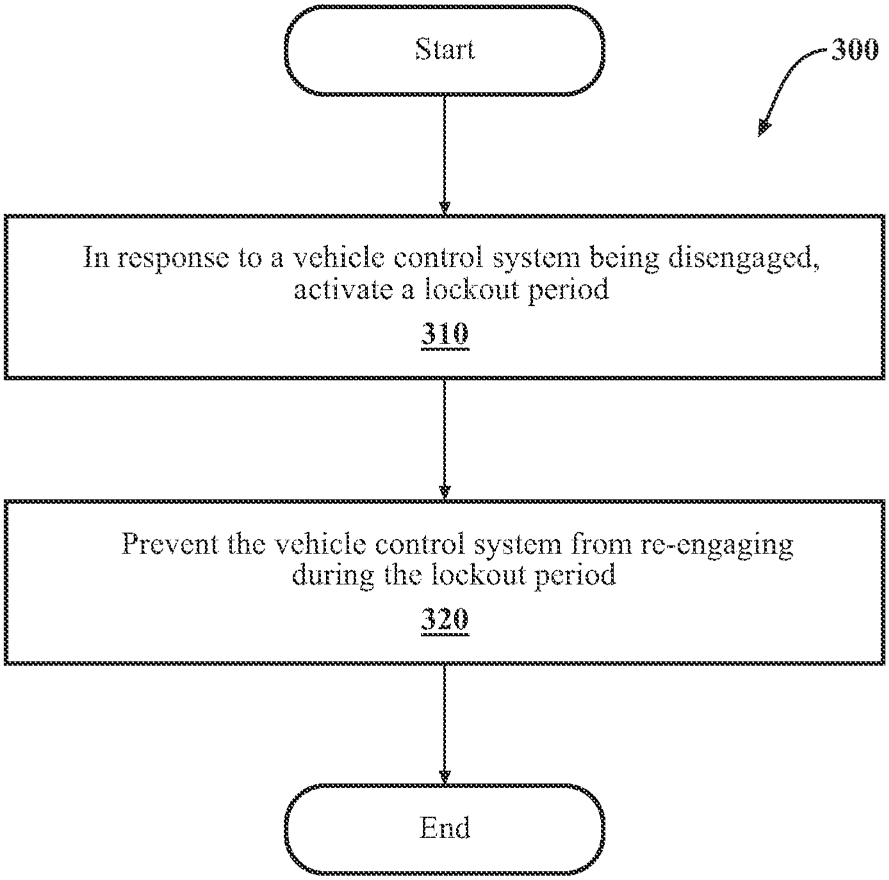
FIG. 3 is an example of a method for preventing unintentionally re-engaging a vehicle control system after recently dis-engaging the vehicle control system.

FIG. 3 illustrates a method 300 for preventing the vehicle control system 160 from re-engaging during the lockout period. The method 300 will be described from the viewpoint of the vehicle 102 of FIG. 1 and the unintentional control re-engagement prevention system 100 of FIGS. 1 and 2. However, the method 300 may be adapted to be executed in any one of several different situations and not necessarily by the vehicle 102 of FIG. 1 and/or the unintentional control re-engagement prevention system 100 of FIGS. 1 and 2.

At step 310, the control module 220 may cause the processor(s) 110 to, in response to a vehicle control system 160 being disengaged, activate a lockout period. The vehicle control system 160 may be disengaged by a user or by a vehicle system 140. In one embodiment, the control module 220 may detect that the vehicle control system 160 is being disengaged using a sensor such as a steering wheel sensor 128 or an input button sensor for detecting when a user has depressed an input button.

As an example, the control module 220 may receive a signal or sensor data 119 indicating that the vehicle control system 160 has been disengaged. In response to receiving the signal and/or the sensor data 119, the control module 220 may determine the time period to associate with the lockout period. The lockout period may be based on a user preference and/or a characteristic of the vehicle control system 160 such as the type of vehicle control system 160. Alternatively and/or additionally, the lockout period may be based on a risk level and/or an environmental condition of a vehicle 102 that includes the vehicle control system 160. As previously disclosed, the lockout period may include multiple phases associated with various functions and/or functional levels of the vehicle control system(s) 160. The control module 220 may determine the phase(s) and the time period(s) for the lockout period based on one or more of the conditions and settings previously mentioned.

At step 320, the control module 220 may cause the processor(s) 110 to prevent the vehicle control system 160 from re-engaging during the lockout period. As such, the control module 220 may prevent the vehicle control system 160 from re-engaging the lockout period. In a case where the lockout period includes multiple phases, the control module 220 may prevent a function and/or functional level of the vehicle control system 160 in one or more phases.

FIG. 1 will now be discussed in full detail as an example environment within which the system and methods disclosed herein may operate. In some instances, the vehicle 102 is configured to switch selectively between an autonomous mode, one or more semi-autonomous operational modes, and/or a manual mode. Such switching can be implemented in a suitable manner, now known, or later developed. "Manual mode" means that all of or a majority of the navigation and/or maneuvering of the vehicle is performed according to inputs received from a user (e.g., human driver). In one or more arrangements, the vehicle 102 can be a conventional vehicle that is configured to operate in only a manual mode.

In one or more embodiments, the vehicle 102 is an autonomous vehicle. As used herein, "autonomous vehicle" refers to a vehicle that operates in an autonomous mode. "Autonomous mode" refers to navigating and/or maneuvering the vehicle 102 along a travel route using one or more computing systems to control the vehicle 102 with minimal or no input from a human driver. In one or more embodiments, the vehicle 102 is highly automated or completely automated. In one embodiment, the vehicle 102 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 102 along a travel route.

The vehicle 102 can include one or more processors 110. In one or more arrangements, the processor(s) 110 can be a main processor of the vehicle 102. For instance, the processor(s) 110 can be an electronic control unit (ECU). The vehicle 102 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

The one or more data stores 115 can include sensor data 119. In this context, "sensor data" means any information about the sensors that the vehicle 102 is equipped with, including the capabilities and other information about such sensors. As will be explained below, the vehicle 102 can include the sensor system 120. The sensor data 119 can relate to one or more sensors of the sensor system 120. As an example, in one or more arrangements, the sensor data 119 can include information on one or more vehicle sensors 121 and/or environment sensors 122 of the sensor system 120.

In some instances, at least a portion of the map data 116 and/or the sensor data 119 can be located in one or more data stores 115 located onboard the vehicle 102. Alternatively, or in addition, at least a portion of the map data 116 and/or the sensor data 119 can be located in one or more data stores 115 that are located remotely from the vehicle 102.

As noted above, the vehicle 102 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 102 (including any of the elements shown in FIG. 1). The sensor system 120 can acquire data of at least a portion of the internal environment as well as the external environment of the vehicle 102 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 102 itself. In one or more arrangements, the vehicle sensor(s) 121 can be configured to detect, and/or sense position and orientation changes of the vehicle 102, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), and/or other suitable sensors. The vehicle sensor(s) 121 can be configured to detect, and/or sense one or more characteristics of the vehicle 102. In one or more arrangements, the vehicle sensor(s) 121 can include a road wheel sensor 127 that detects the movements of the road wheel. The vehicle sensor(s) 121 can include a steering wheel sensor 128 that detects the movements of the steering wheel.

Alternatively, or in addition, the sensor system 120 can include one or more environment sensors 122 configured to acquire, and/or sense data inside the vehicle as well as around the vehicle. Sensor data inside the vehicle can include information about one or more users in the vehicle cabin and any other objects of interest. Sensor data around the vehicle can include information about the external environment in which the vehicle is located or one or more portions thereof.

As an example, the one or more environment sensors 122 can be configured to detect, quantify and/or sense objects in at least a portion of the internal and/or the external environment of the vehicle 102 and/or information/data about such objects.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 102 can include an input system 130. An "input system" includes any device, component, system, element or arrangement or groups thereof that enable information/data to be entered into a machine. The input system 130 can receive an input from a user (e.g., a driver or a passenger). The vehicle 102 can include an output system 135. An "output system" includes any device, component, or arrangement or groups thereof that enable information/data to be presented to a user (e.g., a person, a vehicle passenger, etc.) such as a display interface.

The vehicle 102 can include one or more vehicle systems 140. Various examples of the one or more vehicle systems 140 are shown in FIG. 1. However, the vehicle 102 can include more, fewer, or different vehicle systems 140. It should be appreciated that although particular vehicle systems are separately defined, each or any of the systems or portions thereof may be otherwise combined or segregated via hardware and/or software within the vehicle 102. The vehicle 102 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 102 and/or to determine a travel route for the vehicle 102. The navigation system 147 can include one or more mapping applications to determine a travel route for the vehicle 102. The navigation system 147 can include a global positioning system, a local positioning system or a geolocation system.

As previously mentioned, the vehicle 102 can include one or more vehicle control systems 160. The vehicle control system(s) 160 can be configured to receive data from the sensor system 120 and/or any other type of system capable of capturing information relating to the vehicle 102 and/or the external environment of the vehicle 102. In one or more arrangements, the vehicle control system(s) 160 can use such data to generate one or more driving scene models. The vehicle control system(s) 160 can determine position and velocity of the vehicle 102.

The vehicle control system(s) 160 can be configured to receive, and/or determine location information for obstacles within the external environment of the vehicle 102 for use by the processor(s) 110, and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The vehicle control system(s) 160 can be configured to determine travel path(s), current autonomous driving maneuvers for the vehicle 102, future autonomous driving maneuvers and/or modifications to current autonomous driving maneuvers based on data acquired by the sensor system 120, driving scene models, and/or data from any other suitable source such as determinations from the sensor data 119. "Driving maneuver" means one or more actions that affect the movement of a vehicle. Examples of driving maneuvers include accelerating, decelerating, braking, turning, moving in a lateral direction of the vehicle 102, changing travel lanes, merging into a travel lane, and/or reversing, just to name a few possibilities. The vehicle control system(s) 160 can be configured to implement determined driving maneuvers. The vehicle control system(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The vehicle control system(s) 160 can be configured to execute various vehicle functions and/or to transmit data to, receive data from, interact with, and/or control the vehicle 102 or one or more systems thereof (e.g., one or more of vehicle systems 140).

The processor(s) 110, the unintentional control re-engagement prevention system 100, and/or the vehicle control system(s) 160 can be operatively connected to communicate with the various vehicle systems 140 and/or individual components thereof. For example, returning to FIG. 1, the processor(s) 110, the unintentional control re-engagement prevention system 100, and/or the vehicle control system(s) 160 can be in communication to send and/or receive information from the various vehicle systems 140 to control the movement, speed, maneuvering, heading, direction, etc. of the vehicle 102. The processor(s) 110, the unintentional control re-engagement prevention system 100, and/or the vehicle control system(s) 160 may control some or all of these vehicle systems 140 and, thus, may be partially or fully autonomous.

The processor(s) 110, the unintentional control re-engagement prevention system 100, and/or the vehicle control system(s) 160 may be operable to control the navigation and/or maneuvering of the vehicle 102 by controlling one or more of the vehicle systems 140 and/or components thereof. As an example, when operating in an autonomous mode, the processor(s) 110, the unintentional control re-engagement prevention system 100, and/or the vehicle control system(s) 160 can control the direction and/or speed of the vehicle 102. As another example, the processor(s) 110, the unintentional control re-engagement prevention system 100, and/or the vehicle control system(s) 160 can activate, deactivate, and/or adjust the parameters (or settings) of the one or more driver assistance systems. The processor(s) 110, the unintentional control re-engagement prevention system 100, and/or the vehicle control system(s) 160 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 102 can include one or more actuators 150. The actuators 150 can be any element or combination of elements operable to modify, adjust and/or alter one or more of the vehicle systems 140 or components thereof. Any suitable actuator can be used. For instance, the one or more actuators 150 can include motors, pneumatic actuators, hydraulic pistons, relays, solenoids, and/or piezoelectric actuators, just to name a few possibilities.

The vehicle 102 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising:

in response to a vehicle control system being disengaged, activating a lockout period, the lockout period including a plurality of phases, the plurality of phases including at least a first phase and a second phase;

preventing the vehicle control system from re-engaging when the lockout period is in the first phase; and preventing a portion of the vehicle control system from re-engaging when the lockout period is in the second phase.

2. The method of claim 1, further comprising:

detecting that the vehicle control system is being disengaged using a sensor.

3. The method of claim 1, wherein the lockout period is based on a characteristic of the vehicle control system.

4. The method of claim 1, wherein the lockout period is based on an environmental condition of a vehicle, the vehicle including the vehicle control system.

5. The method of claim 1, wherein the lockout period is based on a risk level.

6. The method of claim 1, wherein the lockout period is based on a user preference.

7. A system comprising:

a processor; and a memory storing machine-readable instructions that, when executed by the processor, cause the processor to:

in response to a vehicle control system being disengaged, activate a lockout period, the lockout period including a plurality of phases, the plurality of phases including at least a first phase and a second phase;

preventing the vehicle control system from re-engaging when the lockout period is in the first phase; and prevent a portion of the vehicle control system from re-engaging when the lockout period is in the second phase.

8. The system of claim 7, wherein the machine-readable instructions further include instructions that when executed by the processor cause the processor to:

detect that the vehicle control system is being disengaged using a sensor.

9. The system of claim 7, wherein the lockout period is based on a characteristic of the vehicle control system.

10. The system of claim 7, wherein the lockout period is based on an environmental condition of a vehicle, the vehicle including the vehicle control system.

11. The system of claim 7, wherein the lockout period is based on a risk level.

12. The system of claim 7, wherein the lockout period is based on a user preference.

13. A non-transitory computer-readable medium including instructions that when executed by a processor cause the processor to:

in response to a vehicle control system being disengaged, activate a lockout period, the lockout period including a plurality of phases, the plurality of phases including at least a first phase and a second phase;

prevent the vehicle control system from re-engaging when the lockout period is in the first phase; and prevent a portion of the vehicle control system from re-engaging when the lockout period is in the second phase.

14. The non-transitory computer-readable medium of claim 13, wherein the instructions further include instructions that when executed by the processor cause the processor to:

detect that the vehicle control system is being disengaged using a sensor.

15. The non-transitory computer-readable medium of claim 13, wherein the lockout period is based on a characteristic of the vehicle control system.

16. The non-transitory computer-readable medium of claim 13, wherein the lockout period is based on an environmental condition of a vehicle, the vehicle including the vehicle control system.

17. The non-transitory computer-readable medium of claim 13, wherein the lockout period is based on a risk level.

18. The non-transitory computer-readable medium of claim 13, wherein the lockout period is based on a user preference.

* * * * *